This invention pertains to actuators, and particularly to a dual hydraulically operated screw and nut actuator.

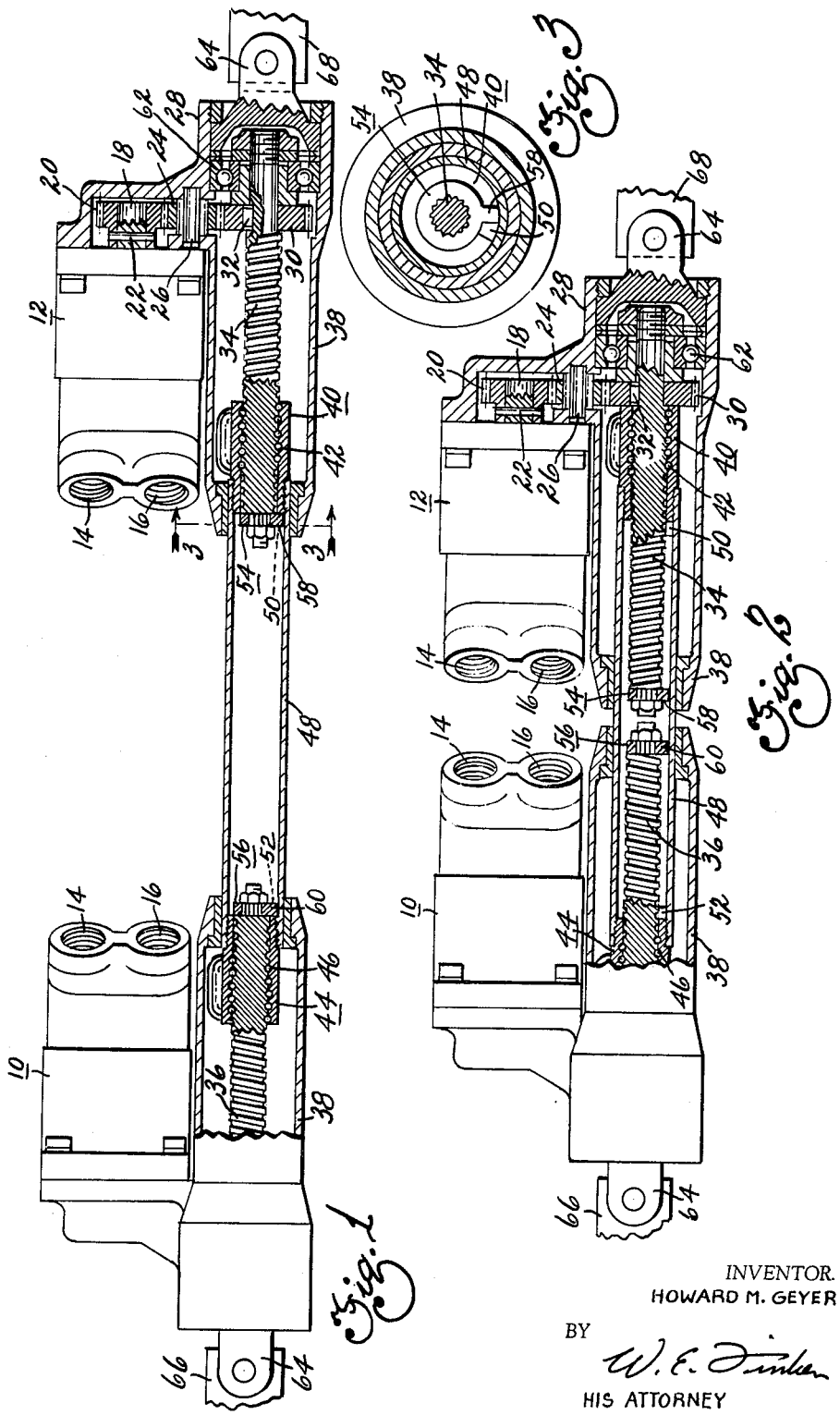
Aug. 24, 1965     H. M. GEYER     3,202,009
ACTUATOR SYSTEM
Filed June 19, 1963
INVENTOR.
HOWARD M. GEYER
BY
W. E. Finken
HIS ATTORNEY 3,202,009
ACTUATOR SYSTEM
Howard M. Geyer, Dayton, Ohio, assignor to General Motors Corporation, Detroit, Mich., a corporation of Delaware
Filed June 19, 1963, Ser. No. 288,958
8 Claims. (Cl. 74—424.8)

Heretofore, dual, or twin, hydraulic actuator systems have been built for aircraft and other applications wherein reliability is a critical factor. That is, where the actuator system is employed to operate control mechanisms on an aircraft, it is desirable to provide alternate power supplies for operating the actuator in the event that one of the power supplies becomes inoperative. However, in prior art dual hydraulic actuator systems, while the system is operative with only one power supply, the load carrying capacity is reduced by fifty percent.

This invention relates to an actuator system wherein none of the load carrying capacity is lost by failure of one power supply, but only the rate of movement affected. Accordingly, among my objects are the provision of a dual actuator system wherein the load carrying capacity remains constant when either one or both of the power supplies are operable; the further provision of a dual hydraulic motor operated screw and nut actuator having full load carrying capacity when either one or both hydraulic motors are operative; the still further provision of an actuator system of the aforesaid type wherein only the rate of actuator movement, but not the load carrying capacity, is affected by failure of one of the hydraulic motors.

The aforementioned and other objects are accomplished in the disclosed embodiment of the present invention by utilizing a pair of rotary hydraulic motors for driving a pair of screw shafts of opposite hands in opposite directions and utilizing a common nut assembly which is normally stationary so that rotation of the screw shafts results in reciprocation thereof to position the load devices. When both hydraulic motors are operating the actuator system has full load carrying capacity at the full rate of movement, but when only one of the motors is operating the rate of movement is reduced by fifty percent while the load carrying capacity remains constant.

Further objects and advantages of the present invention will be apparent from the following description, reference being had to the accompanying drawing, wherein a preferred embodiment of the present invention is clearly shown.

In the drawing:

FIGURE 1 is a longitudinal view, partly in section and partly in elevation, with certain parts broken away of the improved actuator system in the fully extended position.

FIGURE 2 is a view similar to FIGURE 1 with the actuator system in the fully retracted position.

FIGURE 3 is an enlarged, sectional view taken along line 3—3 of FIGURE 1.

With reference to FIGURES 1 and 2, the dual hydraulic system comprises a pair of identical rotary hydraulic motors 10 and 12, each hydraulic motor having threaded inlet and outlet fittings 14 and 16, respectively, for connection to separate hydraulic systems. It is to be understood that the use of hydraulic motors is only exemplary and that the concepts disclosed herein are obviously applicable to other power sources. Each motor includes a rotary output shaft 18 to which an output spur gear 20 is attached by a cross pin 22, the gear 20 meshing with an idler gear 24 journalled on a stub shaft 26 carried by a motor housing 28. The idler gears 24 mesh with spur gears 30 keyed at 32 to their respective coaxial screw shafts 34 and 36.

As shown in the drawing, the end caps of the hydraulic motor housings are integral with sleeves, or housings, 38 which enclose the screw shafts 34 and 36. The screw shafts 34 and 36 are of opposite hands and of the same lead, and form components of ball screw and nut actuator assemblies. Thus, the screw shaft 34 has threaded engagement with a nut 40 through a plurality of circulating balls 42, and the screw shaft 36 has threaded engagement with a nut 44 through a plurality of circulating balls 46. The two nuts 40 and 44 are rigidly interconnected by a sleeve 48 and thus constitute a common nut assembly which causes the screw shaft to move axially upon rotation thereof.

As seen particularly in FIGURE 3, each of the nuts 40 and 44 has an axially extending tang, or abutment, 50 and 52, respectively, and each screw shaft 34 and 36 has a washer 54 and 56. respectively, rigidly connected to its end having a radially extending tang, or abutment, 58 and 60, respectively. As seen in FIGURE 1, the screw shaft 34 is journalled in the housing 38 by a ball bearing assembly 62, it being understood that the screw shaft 36 is journalled in a similar manner in its housing. The housing 38 of the left hand actuator has a fitting 64 which may be coupled to one part of the movable load 66, and the right hand actuator has a similar fitting 64 which may be coupled to another part 68 of a movable load.

As alluded to hereinbefore, the screw shafts 34 and 36 are of opposite hands, and the hydraulic motors 10 and 12 rotate their respective screw shafts in opposite directions. Since the screw shafts are connected with a common nut assembly the hydraulic motors will be automatically synchronized. When both motors are operating the actuator can be fully retracted from the position of FIGURE 1 to the position of FIGURE 2 by rotating the screw shafts so as to result in bodily reciprocation of the screw shafts and their housings and hydraulic motors to the position shown in FIGURE 2. Conversely, with both motors operating, the screw shafts can be rotated so as to extend the actuator by effecting bodily movement of the screw shafts and their housings and motors to the position shown in FIGURE 1.

If one of the hydraulic systems connected to one of the motors should fail, the actuator system remains fully operable and does not lose any load carrying capability. However, the rate of actuator movement is reduced by one-half. Assuming the actuator to be fully retracted as shown in FIGURE 2, with only the motor 12 operating, the motor 12 will rotate its screw shaft 34 thus causing its housing 38 to move axially to the right until it is fully extended as shown in FIGURE 1. In this fully extended position the abutment 50 of the nut 40 engages the abutment 58 on the screw shaft 34 such that continued rotation of the screw shaft 34 will result in rotation of the nut 40, the sleeve 48 and the nut 44 thus causing the screw shaft 36 and its housing 38 to move from its fully retracted position of FIGURE 2 to its fully extended position of FIGURE 1.

Conversely, if the actuator system is fully extended as shown in FIGURE 1 and one of the hydraulic systems should fail, the operable motor can fully retract the actuator since assuming the motor 12 to be operable the right hand actuator can be fully retracted to the position of FIGURE 2 whereat the nut 40 abuts the gear 30 so that continued rotation of the screw shaft 34 will again rotate the nut 40, the sleeve 48 and the nut 44 so as to impart axial movement to the screw shaft 36 and its housing and hydraulic motor. It is to be noted that the present dual hydraulic system does not lose any load carrying capacity when one of the hydraulic motors is rendered inoperative, the only penalty being that the rate of movement is reduced fifty percent.

While the embodiment of the present invention as herein disclosed constitutes a preferred form, it is to be understood that other forms might be adopted.

What is claimed is as follows:

1. A dual actuator system comprising, a pair of rotary motors, a screw and nut actuator comprising a pair of rotatable and axially movable screw shafts of opposite hands and a common nut assembly threadedly engaging said screw shafts, and means coupling each motor to one of said screw shafts whereby simultaneous rotation of said screw shafts in opposite directions will result in conjoint relative axial movement of said screw shafts in opposite directions due to threaded engagement of said screw shafts with said common nut assembly.

2. A dual actuator system comprising, a pair of rotary motors, a screw and nut actuator comprising a pair of coaxially arranged screw shafts of opposite hands and the same lead and a common nut assembly threadedly engaging said screw shafts, and means operably coupling each motor to one of said screw shafts whereby simultaneous rotation of said screw shafts in opposite directions will result in conjoint relative axial movement of said screw shafts in opposite directions due to threaded engagement of said screw shafts with said common nut assembly.

3. A dual actuator system comprising, a pair of rotary motors, a screw and nut actuator including a pair of coaxial screw shafts of opposite hands and the same lead and a common nut assembly threadedly engaging said screw shafts, means coupling each motor to one of said screw shafts for simultaneously rotating said screw shafts in opposite directions, and means whereby upon failure of one of said motors said screw and nut actuator is fully operable with the same load carrying capability from the other of said motors by imparting rotation from said other operable motor to its screw shaft and thence to the common nut assembly so as to reciprocate the other screw shaft.

4. The actuator system set forth in claim 3 wherein said common nut assembly comprises a nut threadedly engaging each screw shaft and a sleeve rigidly interconnecting said nuts, and wherein said last recited means comprises coacting abutments on each nut and each screw shaft which are engageable in the fully extended position of each nut and screw shaft.

5. The actuator system set forth in claim 3 wherein said common nut assembly comprises a nut threadedly connected with each screw shaft and a tube rigidly interconnecting said nuts, and wherein said last recited means comprises a drive gear attached to each screw shaft with which each nut is frictionally engageable at the fully retracted position of each nut and screw shaft.

6. The actuator system set forth in claim 3 wherein said motors are of the hydraulic type and wherein the common nut assembly synchronizes the speeds of said motors.

7. The actuator system set forth in claim 3 wherein said common nut assembly comprises a nut threadedly connected to each screw shaft through a plurality of circulating balls and a tube rigidly interconnecting said nuts.

8. The actuator system set forth in claim 3 wherein said screw shafts are enclosed by housings which reciprocate therewith, and wherein said common nut assembly comprises a nut threadedly connected with each screw shaft and a tube rigidly interconnecting said nuts, said housings having sliding engagement with said tube.

References Cited by the Examiner

UNITED STATES PATENTS 2,771,787   11/56   Dixon _____ 74—424.8

DON A. WAITE, *Primary Examiner.*